United States Patent [19]
Vincent et al.

[11] Patent Number: 4,645,238
[45] Date of Patent: * Feb. 24, 1987

[54] ANNOTATED CALENDAR ASSEMBLY

[75] Inventors: James P. Vincent, Arlington; Mary E. Weidmann, Irving; Donald E. Curtis, Garland, all of Tex.

[73] Assignee: International Business Machines Corporation, Armonk, N.Y.

[*] Notice: The portion of the term of this patent subsequent to May 27, 2003 has been disclaimed.

[21] Appl. No.: 487,375

[22] Filed: Apr. 21, 1983

[51] Int. Cl.$^4$ .................. G09G 3/04; G06F 7/00; G04B 19/24
[52] U.S. Cl. ........................ 283/67; 340/700; 364/300; 368/28
[58] Field of Search ............ 283/67; 368/28, 29, 368/30, 40; 281/15 B; 364/900, 300, 200; 340/700, 706

[56] References Cited

U.S. PATENT DOCUMENTS

| | | | |
|---|---|---|---|
| 3,594,935 | 7/1971 | Blattstein | 281/15 B |
| 3,999,050 | 12/1976 | Pitroda | |
| 4,162,610 | 7/1979 | Levine | 368/28 |
| 4,247,927 | 1/1981 | Oooka et al. | 368/30 |
| 4,270,192 | 5/1981 | Kudo | 368/29 |
| 4,353,178 | 10/1982 | Meezawa | 368/30 |
| 4,428,681 | 1/1984 | Icashio | 368/29 |
| 4,591,840 | 5/1986 | Curtis et al. | 340/700 X |

FOREIGN PATENT DOCUMENTS

| | | |
|---|---|---|
| 0005661 | 5/1979 | European Pat. Off. . |
| 84102530 | 11/1984 | European Pat. Off. . |
| 2537400 | 2/1977 | Fed. Rep. of Germany . |
| 2904664 | 8/1980 | Fed. Rep. of Germany . |
| 2026736 | 2/1980 | United Kingdom .......... 368/30 |

OTHER PUBLICATIONS

Keith Clark Inc. Catalogue, Work-A-Day 1972 Calendars, face page and pp. 2 & 6.
IBM Bulletin, vol. 19, No. 7, Dec. 1976.
IBM Bulletin, vol. 26, Nov. 1, 1984.

*Primary Examiner*—Robert L. Spruill
*Assistant Examiner*—Paul M. Heyrana, Sr.
*Attorney, Agent, or Firm*—J. H. Barksdale

[57] ABSTRACT

A method of assembling, for display, a monthly calendar annotated with exterior current day narrative notes and embedded abbreviated notes. Notes related to a specific day can be prepared on a time independent basis by calling, and keying to, a day screen for the specific day. In addition, keying is used to distinguish between normal and special notes which are to be later displayed in abbreviated and narrative forms, respectively. Upon the occurrence of the specific day and the calling of a calendar screen, the notes are displayed along with an updated calendar. Special notes appear as narrative footnotes and normal notes appear in abbreviated form with the day indications. In the absence of further day screen calling and keying, the footnotes change on a daily basis, while the abbreviated notes remain fixed.

12 Claims, 4 Drawing Figures

```
 1   +   10   +   20   +   30   +   40   +   50   +   60   +   70   +   80
 1                          LOOK AT THE WHOLE MONTH
 2   SCHEDULE FOR: G. J. JOHNSON              DATE: 07/19/83
 3       SUNDAY      MONDAY    TUESDAY  WEDNESDAY  THURSDAY   FRIDAY    SATURDAY
 4
 5                                                            1            2
 6                                                        MM...I..    ...L..M.
 7
 8         3           4         5          6          7      8            9
 9     ........    ........  <MM.....   ..1.....    MMM.....  ........    ........>
10
11        10          11        12         13         14      15           16
12     ........    ........  .*......   ........   ....I...   ........   ......m.
13
14        17          18        19         20         21      22           23
15     ........    ........  <D-..--..  .......D>  ........  ........    ........
16
17        24          25        26         27         28      29           30
18     ........    ........  ........   ........   ..---...  ........    ....VVVV>
19
20        31                   NOTE: REMEMBER THAT WILSON WANTED AUGUST'S FIGURES
21     ........
22
23   PF1 LOOK AT THE DAY  PF2 SCHEDULES  PF3 ROOMS  PF4 NEXT DAY  PF5 PREVIOUS DAY
24   PF7 GROUPS   PF8 PRINT   PF9 HELP   PF10 NEXT MONTH  PF11 PREV. MONTH  PF12 RETURN
     1   +   10   +   20   +   30   +   40   +   50   +   60   +   70   +   80
```

| SCHEDULE FOR: G. J. JOHNSON | | LOOK AT THE WHOLE MONTH | | DATE: 07/19/83 | | |
|---|---|---|---|---|---|---|
| SUNDAY | MONDAY | TUESDAY | WEDNESDAY | THURSDAY | FRIDAY | SATURDAY |
| | | | | | 1<br>MM...I.. | 2<br>...L..M. |
| 3 | 4 | 5<br><MM.. | 6<br>..I.. | 7<br>MMM.. | 8 | 9<br>..> |
| 10 | 11 | 12<br>.*.. | 13<br>..I.. | 14<br>..I.. | 15 | 16<br>..m. |
| 17 | 18 | 19<br><D-..-.. | 20<br>..D> | 21 | 22 | 23 |
| 24 | 25 | 26 | 27 | 28<br>--- | 29 | 30<br>.VVV V> |
| 31 | | NOTE: REMEMBER THAT WILSON WANTED AUGUST'S FIGURES | | | | |

PF1 LOOK AT THE DAY  PF2 SCHEDULES  PF3 ROOMS  PF4 NEXT DAY  PF5 PREVIOUS DAY
PF7 GROUPS  PF8 PRINT  PF9 HELP  PF10 NEXT MONTH  PF11 PREV. MONTH  PF12 RETURN

FIG. 1

```
SCHEDULE FOR: G. J. JOHNSON     LOOK AT OR CHANGE THE SCHEDULE
                                         DATE:  07/19/83 , TUESDAY

BEGIN    END      DESCRIPTION
7:30AM   9:00AM   PERS: COUNSELING SESSION WITH BILL
9:00AM   10:00AM  DEPARTMENT MEETING- WILSON'S OFFICE
                  BRING FIGURES FOR AUGUST.
10:00AM  11:00AM  CONF: REVIEW NEW SYSTEM WITH JOHN
1:00PM   3:00PM   CLASS
NOTES:   REMEMBER THAT WILSON WANTED AUGUST'S FIGURES
         COMPARED WITH THOSE OF JUNE AND JULY AND
         ANY DIFFERENCES EXPLAINED.

PF1 MOVE  PF2 COPY  PF3 QUIT  PF4 NEXT  PF5 PREV.  PF6 MONTH  PF9 HELP  PF12 RETURN
```

FIG. 2

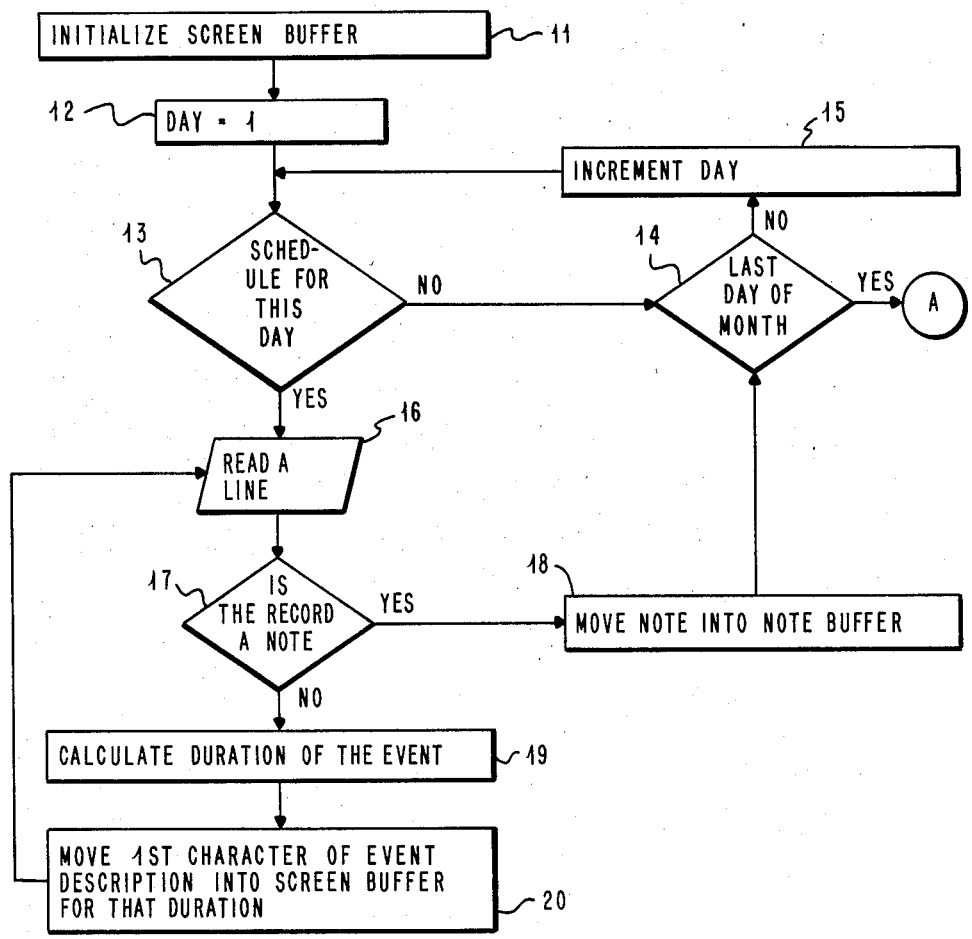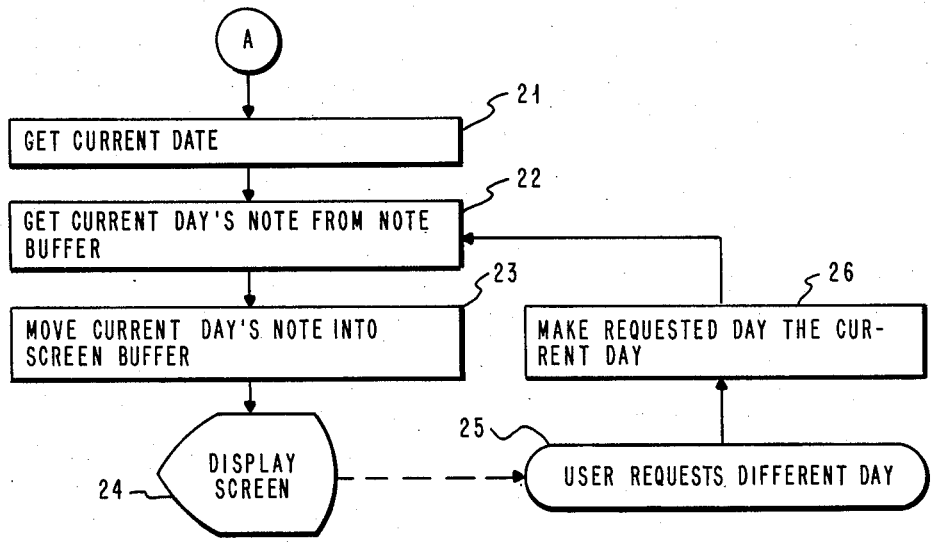
FIG. 4

ANNOTATED CALENDAR ASSEMBLY

TECHNICAL FIELD

This invention relates generally to calendaring, and more specifically to assembly of an annotated calendar containing abbreviated event notes and narrative event related notes.

BACKGROUND ART

Calendars and uses thereof are many and vary widely. By calendar is meant any medium carrying a plurality of past, present, or future day indications. The day indications can be spelled out with alphabetical characters and/or made up of numeric characters. One type of popular calendar in use today is a day oriented ring binder having a separate page or sheet of paper for each day. Each page has imprinted thereon a date and two pages are dedicated to each date. A monthly calendar related to the date is imprinted on one of the pages. The pages occur consecutively in the binder according to date. Blank space is provided a user for preparing or writing in event notes related to the page date. The event notes can be information related to a meeting, conference, appointment, etc. The notes can be narrative, abbreviated, etc. The user can be the owner of the calendar as well as a visual reviewer of the calendar.

Another type of popular calendar has a month or portion thereof depicted on each page in grid form. This type of calendar has day blocks containing day numbers. Blank space surrounds the numbers in the blocks and is used by a user for entering event notes. The extensiveness of the notes which can be entered is directly related to the size of the blocks, user writing, etc. For a heavily scheduled user such as someone having different meetings every hour or so each day, providing sufficient space for meaningful notes would require a calendar of unwieldly size. A more manageable alternative is reversion to the previously described day oriented ring binder. Underlying major problems still exists, though. One is the excessive time required to leaf back and forth through the pages in search of a desired date for entering a note. Another is clutter. As the number of notes grows, the time required to read and decipher the notes increases.

With the advent of application driven keyboard/display work stations, the door was opened for application programmers to create a so-called electronic calendars. The most pertinent known work of others includes the creation of a monthly calendar grid similar to that described above and having embedded note abbreviations for timed day events. This annotated calendar is created from both month and day screens. That is, based on a clock, day blocks on the monthly calendar grid screen are filled in with appropriate day numbers on one line in each of the blocks. Then, based on keying and creating filled in day screens, abbreviations are filled in on another line in the blocks. No narrative information is provided for on the calendar screen. As is the case in certain instances, there is a need to obtain meaningful detail related to an abbreviation. This requires recall of a day screen. An example is an important reminder non-correlatible to the abbreviation, such as a note to bring materials to a meeting in conference room F. The fact of a meeting is provided for with an abbreviation such as "M". However, the reminder is not provided for and recall is in order.

Another problem with the above-mentioned prior work of others is that excessive day screen keying is required to handle abbreviations. That is, abbreviations have to be keyed in on the day screen. This requires time and thought. Yet another problem with the prior work of others is that the positional relationship to time of the abbreviation is not readily discernible. That is, a user can not always accurately correlate a meeting time with the location of the abbreviation in the day block.

In addition to the above, with the advent of application driven keyboard/display work stations, document footnoting become more readily manageable. That is, correlating footnotes and pages such that the footnotes appear on the same page with a corresponding footnote references is now a system operation. Drawing any analogy between document footnoting and the instant invention requires that the body text for a page of a footnoted document be equivalent to a monthly calendar grid. The two are not equivalent, though. Calendar day oriented footnotes must change on a daily basis in relation to a relatively fixed monthly calendar. As such, the footnoting of documents, taken alone or in combination with work of others, is not considered to either anticipate the instant invention or render the instant invention obvious.

The invention of this application presents advances over known art or work of others in that the flexibility in the use and creation of day screens is improved, and day screen event related information in narrative form is available as a footnote upon combined screen creation. The advantages of these advances are that screen size does not have to be increased, more meaningful information can be presented to a user, and information is readily available in uncluttered form.

DISCLOSURE OF THE INVENTION

A unique method of assembling an annotated calendar is provided in order that time related information is presented to a user in an uncluttered and readily retrievable and understandable manner. The calendar is assembled from day and month screens. The month screens are built in grid form such that blocks are provided for each day of the month. Within the blocks are day indications made up of a number of numeric characters. Surrounding each day indication is blank space for carrying event information which is abbreviated from a corresponding day screen. Abbreviations are used for standard items such as meetings. Located adjacent the bottom of the grid is space for carrying event related information in narrative form from a day screen. The information which is to appear in narrative form has special significance, such as a reminder to bring materials to a meeting.

Day screens are built by keying in a date, a time, information about the keyed in time, and narrative event related notes. Based on date keying, an appropriate month grid is built. Based on time and related information keying, the first character of the related information is positionally located time-wise in the blank space in the appropriate block. Based on narrative event related note keying and a clock, the note is positioned adjacent the bottom of the grid as a footnote on the appropriate day's screen. As day screens are updated, the assembled calendar is updated. However, updating of the footnote will only be effective on the assembled calendar on the current date.

BRIEF DESCRIPTION OF THE DRAWING

FIG. 1 is a pictorial representation of an annotated calendar assembled according to this invention.

FIG. 2 is a pictorial representation of a filled in day screen or daily appointment schedule for a current day which is used in assembling the calendar of FIG. 1.

FIG. 4 shows a flow diagram of the software operations performed by the structure of FIG. 3 for assembling the calendar of FIG. 1.

BEST MODE FOR CARRYING OUT THE INVENTION

Figure 3:
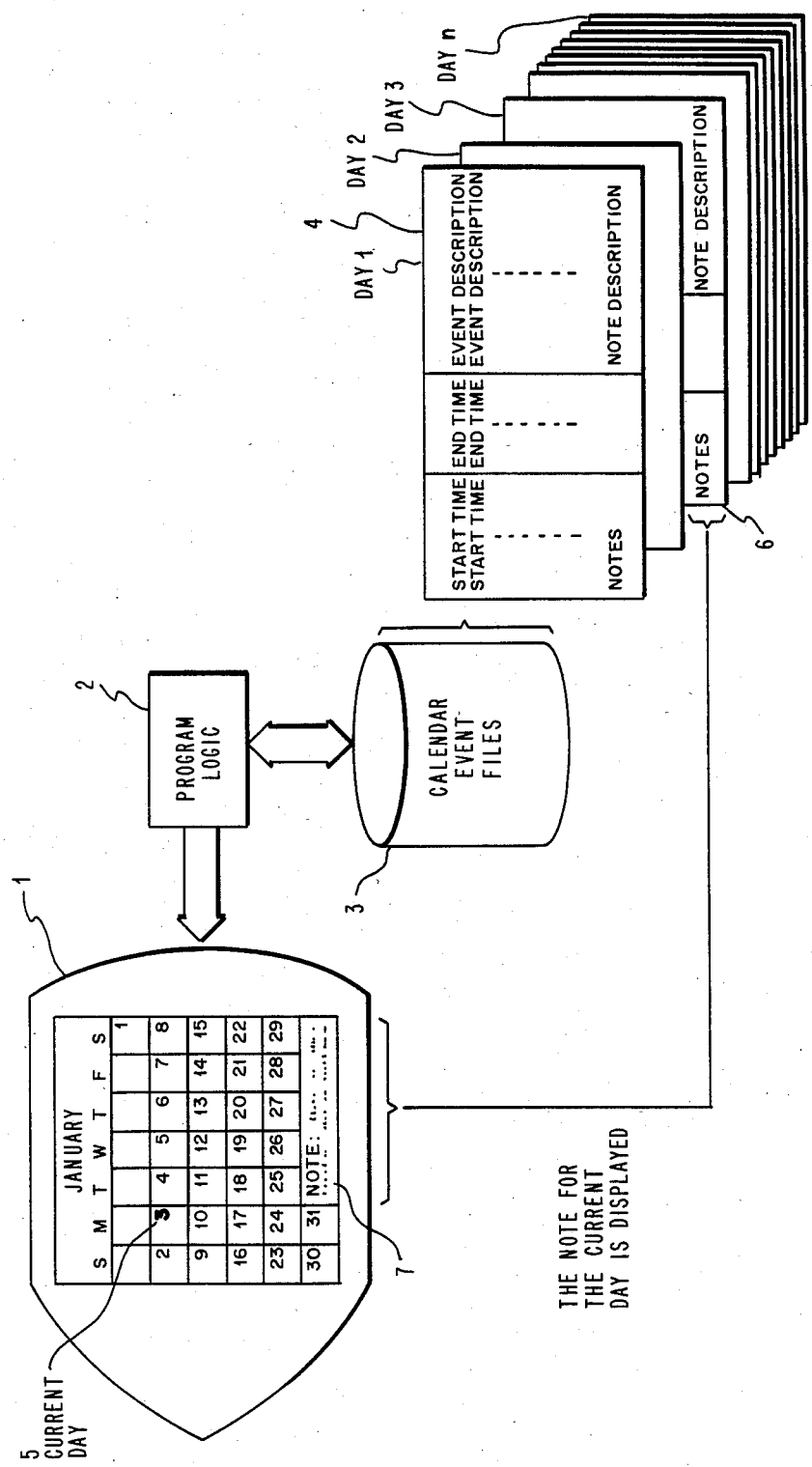
FIG. 3 illustrates a day and month screen relationship, and in generalized block diagram form, the structure for assembling the calendar of FIG. 1.

For a more detailed understanding of the invention, reference is first made to FIG. 1. In this figure, a calendar for the month of July 1983 is depicted in grid form, and is annotated with hourly event abbreviations and a narrative event related footnote. The depicted grid is a rectangular array of seven by six day blocks with Sundays occupying the first or left column of blocks. The bottom row has two blocks on the left hand side of the grid. With this arrangement, any given month having 31 days and beginning on the Saturday in the top right hand corner of the grid, will end no later than Monday.

When the whole month is displayed on a display device of at least 24 lines of 80 characters, each day block can be two character rows high and 10 characters wide. Within each day block, numeric characters appear on the top row to indicate the date. On the bottom row a single character abbreviation can be used to represent each event note. Referring to Friday, July 1, the "M" positionally located at both the 9:00 and 10:00 a.m. time slots can be an abbreviation for the events "Meeting in Bill's office" and "Meeting in conference room G", respectively. It is to be noted that periods follow the M's. Each of these periods represent an hour of the day, assumed here to begin at 9:00 a.m. and end at 5:00 p.m., and appear to aid a user in visually correlating the time of the abbreviation. Without the periods, determining that the "I" is at 2:00 p.m. is not that easy a chore. The abbreviations can be assigned by the user or selected by the system. For example, when two events overlap, a flagging character, "*" can be assigned. As alluded to above, a period is used for unscheduled times. When the whole month is displayed in this manner, the free and unscheduled times of each day can be readily determined.

The equivalent of the rightmost five block positions on the bottom row is unused with the above described grid arrangement. As will be explained in greater detail hereinafter, this heretofore unused space can be used for narrative event related notes concerning a current date. The current date in most instances is "today's date". It can also be a specified date. That is, the current date can be the date specified for viewing a calendar of a different date.

Again, the annotated calendar of FIG. 1 is built from day and month screens. The month screen is built including the grid outline of FIG. 1 with the date indications appropriately located in the blocks for the month of the screen. For May 1983, the day indication "1" would appear in the top left hand block (under the Sunday column and in the top row). In building the month screen, the days of the week appear along the top of the grid, the name of the screen "Look at the Whole Month" appears at the top, a help chart appears at the bottom, etc.

Referring next to FIG. 2, there is illustrated a filled in day screen. When initially called, the screen contains all entries with the exception of those immediately under the headings "BEGIN", "END", and "DESCRIPTION". The date opposite "Date:" is initially today's date as determined by a clock.

By entering times under the BEGIN and END headings, positional locations for event note abbreviations and codes in a subsequently built annotated calendar are established. For a standard eight hour day beginning, for example, at 9:00 a.m. and ending at 5:00 p.m., the abbreviations are system selected as the first character of the event note under the DESCRIPTION heading. Since the current date (July 19, 1983) events begin on the half hour and before 9:00 a.m., a code or "<" character is positioned in the screen of FIG. 1 against the left border of the day block. This is to alert a user that an other than normal schedule has been established. In like manner, a ">" indicates that the day's events will extend beyond 5:00 p.m. The hyphens appearing following the "D" are coded indications that the events corresponding to the times are personal or private in nature and the viewer in this case only need know that events are scheduled during the corresponding times.

The term "NOTES:" under BEGIN is operator entered. The system will recognize any narrative event related note entered opposite thereto as being scheduled for inclusion as a footnote during later annotated calendar assembly. Depending on the extensiveness of the note and available space in the screen of FIG. 1, the note will be included in full, or partially as shown in FIG. 1.

From the above, normal event notes are abbreviated and embedded during an annotated calendar assembly operation, while narrative event related notes having special significance are set out in narrative form as footnotes exterior of the grid.

Refer next to FIG. 3. In this figure is shown in a generalized form the structure for creating or assembling an annotated calendar. In response to a request to assemble and display a monthly annotated calendar on display device 1, program logic 2 reads each of the daily files 4 from mass storage 3 for a given month and condenses the hourly events into an abbreviated format. When the file for the current day 5 is processed, the note section 6 from the daily file is formatted into the unused portion of the calendar display as a footnote 7. When the current day is changed on the monthly display, the program logic 2 does not need to reformat the abbreviated events, but simply finds the special narrative event related note for the new day, and moves it to the footnote area.

Reference is next made to FIG. 4 wherein there is illustrated in greater detail the operations performed by program logic 2 in assembling the annotated calendar of FIG. 1. To begin with, a screen buffer included in a standard general purpose computer system such as the system of FIG. 3 is initialized. This is indicated by block 11 with the monthly grid as if there are no events scheduled at any time during the month. Next, a counter included in the system is set to the first day of the month as indicated by block 12. Thereafter, a determination is made as to whether there are any events scheduled for the first day. This operation is indicated by logic sequence 13. If not, a determination is made by logic sequence 14 as to whether there are any more days in the month. If there are more days in the month, the day is incremented as indicated by block 15, and processing continues at logic sequence 13.

If there are events scheduled on the day represented by the count of block 15, a line is read from the corresponding daily schedule as indicated by block 16. Next, a determination is made by logic sequence 17 as to whether the line read is a special event related note or an hourly or other timed event. If it is a special narrative note, the note is written into a special buffer included in the system. The special buffer will contain all notes to be displayed in narrative form for the month as indicated by block 18. Since only the first of the narrative event related notes are displayed, processing continues with logic sequence 14.

If the line read is an event note to be abbreviated, the duration of the event is calculated as indicated by logic sequence 19. The first character of the event note description is moved into the screen buffer and repeated to indicate the duration of the event as indicated by block 20. The duration may be from 9:00 to 11:00 a.m., for example.

When all of the days in the month have been processed, today's date is retrieved from a clock as indicated by block 21. The number of the day is used to find the current day's narrative event related note in the special note buffer included in the system. This is indicated by block 22. This narrative event related note is moved to the bottom right hand portion of the screen buffer as indicated by block 23. Thereafter, the assembled annotated monthly calendar screen is displayed as indicated by block 24. If the user requests to view a different day's notes by keying in the number of the day as indicated by block 25, the requested day is made the "current" day as indicated by block 26, and processing continues with block 22.

From the above, in the absence of further day screen editing, abbreviated notes for a whole month remain fixed while special narrative notes change on a daily basis.

In summary, a unique method of assembling an annotated calendar is provided in order that time related information is presented to a user in an uncluttered and readily retrievable and understandable manner. The calendar is assembled from day and month screens. The month screens are built in grid form such that blocks are provided for each day of the month. Within the blocks are day indications made up of a number of numeric characters. Surrounding each day indication is blank space for carrying event information which is abbreviated from a corresponding day screen. Abbreviations are used for standard items such as meetings. Located adjacent the bottom of the grid is space for carrying event related information in narrative form from a day screen. The information which is to appear in narrative form has special significance, such as a reminder to bring materials to a meeting.

Day screens are built by keying in a date, a time, information about the keyed in time, and narrative event related notes. Based on date keying, an appropriate month grid is built. Based on time and related information keying, the first character of the related information is positionally located time-wise in the blank space in the appropriate block. Based on narrative event related note keying and a clock, the note is positioned adjacent the bottom of the grid as a footnote on the appropriate day's screen. As day screens are updated, the assembled calendar is updated. However, updating of the footnote will only be effective on the assembled calendar on the current date.

While the invention has been particularly shown and described with reference to a preferred embodiment, it will be understood by those skilled in the art that various changes in form and detail may be made without departing from the spirit and scope of the invention.

We claim:

1. A method of assembling and displaying an annotated calendar, said method comprising:
   (1) creating a combined screen from separate calendar and day screens;
   (2) including a footnote applicable to a current date in said combined screen to form said annotated calendar; and
   (3) displaying said annotated calendar.

2. A method according to claim 1 including locating said footnote exterior or said calendar.

3. A method according to claim 2 including creating said calendar in grid form forming blocks for a plurality of dates with each block having associated therewith a different date indication.

4. A method according to claim 3 including creating said calendar screen based on a clock.

5. A method according to claim 4 including creating said combined screen based on said clock.

6. A method according to claim 5 including creating said day screen independent of said clock.

7. A method according to claim 6 including creating said day screen based on an entry related to time and a note entry.

8. A method according to claim 7 including creating said combined screen with entries related to time from each day screen corresponding to said calendar screen indicated in appropriate ones of said blocks in abbreviated form.

9. A method according to claim 8 including creating said calendar screen with date indications within said blocks.

10. A method according to claim 8 including creating said combined screen with said note entry as a footnote.

11. In a computer system, a method of aiding a user of a computer created calendar in visually ascertaining a time of an abbreviated event, said method comprising:
    (a) displaying on a display device an abbreviation for a scheduled event for a day on said calendar, said abbreviation being positioned timewise for said day; and
    (b) displaying on a display device an unscheduled time representation for a time for which no event has been scheduled.

12. A method according to claim 11 including displaying a period as said representation for unscheduled time.

* * * * *